United States Patent
Font Calafell et al.

(10) Patent No.: US 12,427,715 B2
(45) Date of Patent: Sep. 30, 2025

(54) 3D OBJECTS WITH LAYERS OF SOLIDIFIED AND VOID PORTIONS

(71) Applicant: Peridot Print LLC, Palo Alto, CA (US)

(72) Inventors: Davinia Font Calafell, Sant Cugat del Valles (ES); Alberto Maria Canals Pou, Sant Cugat del Valles (ES); Adam Franks, Grenoble (FR)

(73) Assignee: Peridot Print LLC, Palo Alo, CA (US)

( * ) Notice: Subject to any disclaimer, the term of this patent is extended or adjusted under 35 U.S.C. 154(b) by 294 days.

(21) Appl. No.: 18/028,529

(22) PCT Filed: Oct. 13, 2020

(86) PCT No.: PCT/US2020/055371
§ 371 (c)(1),
(2) Date: Mar. 25, 2023

(87) PCT Pub. No.: WO2022/081140
PCT Pub. Date: Apr. 21, 2022

(65) Prior Publication Data
US 2023/0356457 A1  Nov. 9, 2023

(51) Int. Cl.
*B33Y 50/02* (2015.01)
*B29C 64/124* (2017.01)
(Continued)

(52) U.S. Cl.
CPC .......... *B29C 64/124* (2017.08); *B29C 64/393* (2017.08); *B33Y 50/02* (2014.12); *B33Y 80/00* (2014.12)

(58) Field of Classification Search
CPC .................................................... B33Y 50/02
See application file for complete search history.

(56) References Cited

U.S. PATENT DOCUMENTS 5,997,795 A * 12/1999 Danforth ............. B29C 33/3842
419/36
2013/0025036 A1* 1/2013 Turner .................... A42B 3/125
2/455
(Continued)

FOREIGN PATENT DOCUMENTS

KR 102075919 B1 * 5/2020 ............. B22D 47/02
KR 102132776 B1 * 7/2020 ............. B33Y 70/00
(Continued)

OTHER PUBLICATIONS

Saunders, S., "3D Printed Self-Healing Material Can Fix Sole of Shoe In Two Hours," retrieved at https://3dprint.com/237006/3d-printed-self-healing-material/, Feb. 25, 2019, pp. 5.

*Primary Examiner* — Suresh Suryawanshi
(74) *Attorney, Agent, or Firm* — Michael Dryja (57) ABSTRACT

An object of which at least a part has been 3D printed is disclosed herein. The part comprising a plurality of layers of a predetermined thickness including an outer layer and an underlying layer immediately below the outer layer. The outer layer comprises a first set of solidified portions and a first set of voids arranged in a 3D pattern such that the first set of solidified portions are raised above the underlying layer to form a first functional structure. The underlying layer comprises a second set of solidified portions and a second set of voids arranged in a 3D pattern such that the second set of solidified portions are raised above its underlying layer, to form a second functional structure, wherein the voids are encapsulated within the object; such that removal of a portion of the outer layer exposes a corresponding portion of the second functional structure.

15 Claims, 3 Drawing Sheets

(51) Int. Cl.
*B29C 64/393* (2017.01)
*B33Y 80/00* (2015.01)

(56) References Cited

U.S. PATENT DOCUMENTS

| | | | |
|---|---|---|---|
| 2014/0020192 A1 | 1/2014 | Jones et al. | |
| 2015/0351493 A1* | 12/2015 | Ashcroft | A43B 13/18 36/132 |
| 2016/0346997 A1* | 12/2016 | Lewis | B33Y 80/00 |
| 2016/0354896 A1* | 12/2016 | Lewis | B24B 37/26 |
| 2017/0119092 A1 | 5/2017 | Lee-Sang | |
| 2017/0332733 A1 | 11/2017 | Cluckers et al. | |
| 2018/0029419 A1* | 2/2018 | Kim | B60C 7/12 |
| 2019/0077100 A1 | 3/2019 | Li et al. | |
| 2019/0134896 A1 | 5/2019 | Lebron et al. | |
| 2020/0147750 A1 | 5/2020 | Bajaj et al. | |
| 2021/0245247 A1* | 8/2021 | Hower | B22F 10/47 |

FOREIGN PATENT DOCUMENTS

| | | |
|---|---|---|
| WO | 2017/182930 A2 | 10/2017 |
| WO | 2018/183803 A1 | 10/2018 |

* cited by examiner

3D OBJECTS WITH LAYERS OF SOLIDIFIED AND VOID PORTIONS

BACKGROUND

Parts of some objects are manufactured by additive manufacturing or three-dimensional printing systems. 3D printers generate 3D objects by selectively solidifying portions of successively formed layers of build material on a layer-by-layer basis.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the term "about" is used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same functionality.

3D printers generate 3D objects based on data in a 3D model of an object or objects to be generated, for example, using a CAD computer program product. 3D printers may generate 3D objects by selectively processing layers of build material. For example, a 3D printer may selectively treat portions of a layer of build material, e.g. a powder, corresponding to a layer of a 3D object to be generated, thereby leaving the portions of the layer un-treated in the areas where no 3D object is to be generated.

Some examples of 3D printers may selectively treat portions of a layer of build material by, for example, ejecting a printing liquid in a pattern corresponding to the 3D object. Examples of printing liquids may include fusing agents, detailing agents, curable binder agents (e.g., thermally or ultra-violet curable agents) or any printing liquid suitable for the generation of a 3D object.

Other 3D printers may selectively treat portions of the layer of build material by, for example, using a focused energy source (e.g., laser, solid state emitter) to the portions of the layer of build material to be solidified. Some of these printers, such as Selective Laser Sintering (SLS), may use a powdered build material. Some others of these printers, such as Stereolithography (SLA) 3D printers, may use a liquid build material.

As mentioned above, some 3D printers use fusing agents to treat the portions of the layer of build material. Energy is then applied to the layer of build material and those portions, on which a fusing agent has been applied, absorb sufficient energy to heat up, melt, coalesce and solidify upon cooling.

Other agent 3D printing systems use a thermally or ultra-violet (UV) curable binder agent which has to be heated to a predetermined temperature to cause components of the liquid binder agent to bind together particles of build material on which it is applied. Such a liquid binder agent may comprise, for example, latex particles.

Suitable powder-based build materials for use in additive manufacturing include polymer powder, metal powder or ceramic powder. In some examples, non-powdered build materials may be used such as liquids, gels, pastes, and slurries.

3D printers are used to generate 3D objects or 3D parts that may be used individually or may be included within objects manufactured in a different manner. Using 3D printing compared to traditional manufacturing methods enable the manufacturing of more complex structures that lead to the generation of objects with enhanced capabilities.

Figure 1A:
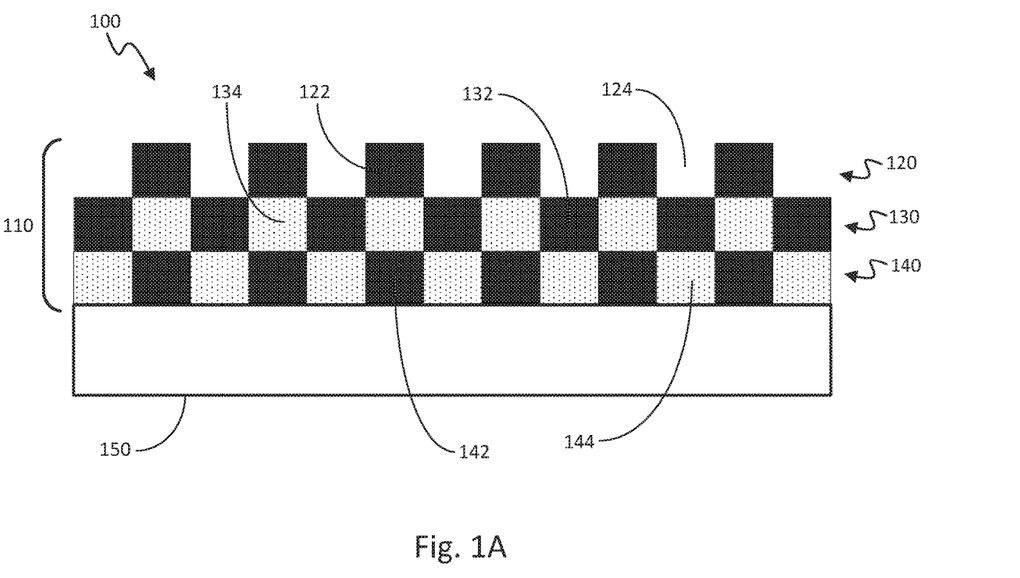
FIG. 1A is a schematic diagram showing an example of an object at least a part of which has been 3D printed.
Figure 1B:
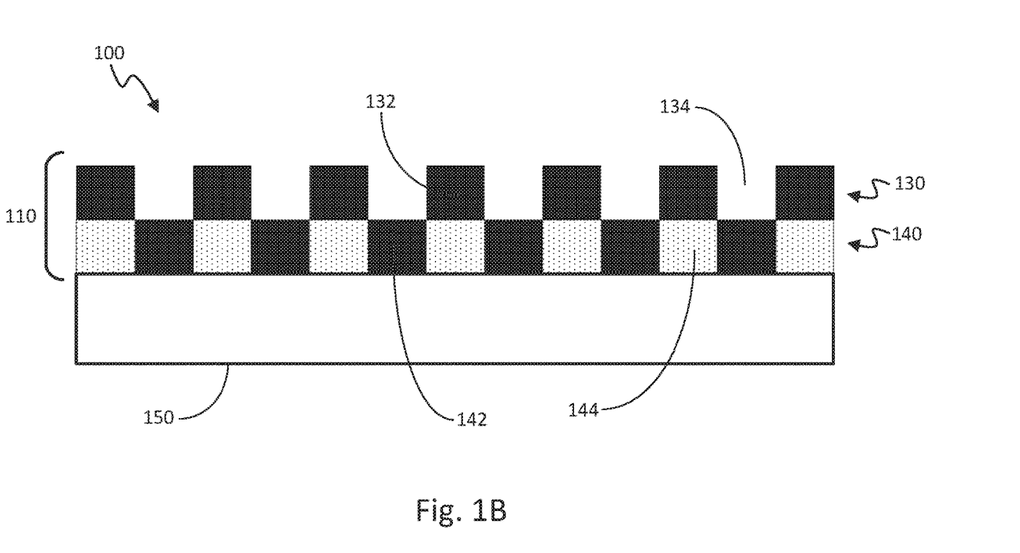
FIG. 1B is a schematic diagram showing an example of an object at least part of which has been 3D printed, and of which a portion thereof which has been removed.

Referring now to the drawings, FIGS. 1A and 1B are schematic side-view diagrams showing an example of an object 100 of which a part 110 has been 3D printed. In some examples the 3D printed part 110 constitutes the entirety of the object 100. In other examples, however, the 3D printed part 110 is a subset of the object which is later assembled or attached to other subsets 150 corresponding to the rest of the object. The other subsets 150 may, or may not, be 3D printed.

The part 110 of the object 100 comprises a plurality of object layers 120, 130, 140, of a predetermined thickness. In the illustrated example, the thickness of an object layer (e.g., layers 120, 130, 140) is shown in the drawings as the dimension in the vertical axis. In some examples the thickness of an object layer (e.g., layers 120, 130, 140) may range from about 50 microns to about 2 centimeters, for example, about 50 microns, 100 microns, 500 microns, 1 millimeter, 5 millimeters, 1 centimeter and 2 centimeters. In other examples, a layer of the plurality of layers may be thicker than about 2 centimeters. As mentioned above, the plurality of layers that constitutes the part 110 may be 3D printed in a layer-wise manner using any of the 3D printing technologies disclosed above. The thickness of each build material layer may range from about 50 to about 120 microns, for example, about 50, 70, 80, 90, 100, or 120 microns. In some examples, different ones of the plurality of layers may have different thicknesses. Therefore, a single object layer (e.g., layers 120, 130, 140) may be manufactured using a plurality of build material layers.

The part 110 of the object 100 may comprise any number of object layers, for example, 2, 3, 4, 5, 6, 10 or 30 layers. For clarity purposes, the examples herein make reference to a part 110 of the object 100 that has three layers of the same thickness. The plurality of layers of the part 110 includes an outer layer 120, an underlying layer 130 immediately below the outer layer 120 and an inner layer 140 immediately below the underlying layer 130.

The outer layer 120 comprises a first set of solidified portions 122 and a first set of voids 124 arranged in a 3D pattern such that the first set of solidified portions 122 are raised above the underlying layer 130 to form a first functional structure. A functional structure may be understood as a 3D pattern designed to add a functionality to the part 110 of the object 100. Some example functionalities may include ergonomic comfort, performance enhancement, aesthetic designs, mechanic interaction, and the like. The 3D pattern may be arranged, for example, to include a circular pattern, a geometric pattern or any other pattern suitable to enable a desired functionality to the part 110 of the object 100. In some examples, the 3D pattern may be designed in such a way that the first set of solidified portions 122 has a constant cross-section. However, in other examples, the 3D pattern may be designed in such a way that the first set of solidified portions 122 has a variable cross-section, for example, in a direction perpendicular to the surface of the layer.

The underlying layer 130 comprises a second set of solidified portions 132 and a second set of voids 134 arranged in a 3D pattern such that the second set of solidified portions 132 are raised above its underlying layer to form a second functional structure. In the illustrated example, the underlying layer of the underlying layer 130 is the inner layer 140 which further comprises a set of solidified portions 142 and a set of voids 144. The voids of the underlying layer 130 and the inner layer 140 are encapsulated within the object 100, therefore being fully surrounded by other parts of the object 100. In some examples, the inner layer 140 is the layer to be attached to the subset 150 corresponding to the rest of the object 100. In some examples, there may be a plurality of underlying layers. In other examples in which the part 110 of the object comprises two layers, the underlying layer 130 and the inner layer 140 may be the same layer.

The voids of the underlying layer 130 and the inner layer 140 are filled with a substance which varies depending on the 3D printing technology used. In the examples in which the part 110 of the object 100 is generated with an FDM 3D printer, the substance of the encapsulated voids is the gas in which the 3D printer build chamber is subject to, for example, atmospheric air or nitrogen. In the examples in which the part 110 of the object 100 is generated with an SLA 3D printer, the substance of the encapsulated voids is a non-solidified liquid build material. In the examples in which the part 110 of the object 100 is generated with a fusing agent 3D printer or a SLS 3D printer, the substance of the encapsulated voids is a non-solidified powdered build material.

FIG. 1B shows an example of the object 100 where the outer layer 120 has been removed. In the examples herein, the removal of a layer may be understood as an active removal or a passive removal; thereby including removal caused by actions in which the user takes out the outer layer 120 (e.g., tearing off the layer), actions in which the outer layer 120 degrades due to usage of the object 100 (e.g., wearing out the layer), exhaustion of the outer layer 120 after exposure of the layer to some substance, or the like.

The plurality of layers of the part 110 of the object 100 are arranged such that removal of a portion of the outer layer 120 exposes a corresponding portion of the second functional structure from the underlying layer 130, thereby releasing the substance (e.g., gas, un-solidified liquid build material, un-solidified powdered build material) from the exposed voids. In some examples, the substance is released with the aid of gravity (e.g., un-solidified liquid build material, un-solidified powdered build material). In other examples, the substance is released as soon as the portion of the second functional structure is open to the atmosphere (e.g., when the substance is a gas).

In one example, once exposed, the second functional structure of the underlying layer 130 performs the same function as the function performed by the first functional structure of the outer layer 120. This enables the surface of the portion 110 of the object 100 to maintain the functionality provided by the first functional structure as different portions of the outer layers are removed, e.g. through wear.

In some examples, it may be desired that the part 110 of the object 100 has the same functionality after the removal of the outer layer 120. In these examples, the first and second functional structures of the outer layer 120 and the underlying layer 130 respectively may have substantially the same pattern. In other examples, however, it may be desired that the part 110 of the object 100 has a different functionality after the removal of the outer layer 120. In these other examples, the first and second functional structures may have a different pattern.

The disclosed part 110 of the object may have a plurality of different applications. In an example, the part 110 is an outer sole of a prosthetic or athletic shoe. In the examples of a prosthetic shoe, the first and second functional structures may be designed such that the functional behavior of the shoe changes with usage (e.g., time), thereby enabling a shoe whose function evolves as the outer sole wears over time. In another example, the part 110 is an outer sole of an athletic shoe, where the first and second functional structures correspond, for example, to a boot cleat or stud. In yet another example, the part 110 is a tread of a tyre (i.e., car tyre, bicycle tyre, scooter tyre) whose surface functionality is maintained even as layers of the tread wear over time.

In other examples, the part 110 is a gripping portion of a device, such as a sports racket, golf clubs, ski sticks, motorbike or bike handlebars, or any other grippable device. The first and second functional structures enable devices that provide ergonomic comfort as well as performing a functionality which is maintained as the gripping portion of the device wears out over time.

Some other examples which may benefit from the above-describe techniques may include sanding pads for wood working and cleaning pads which may have different functional patterns within the plurality of layers. For example a first functional pattern on the outer layer 120 may have a 3D pattern corresponding to a coarse grain sanding pad (e.g., 180 grain), a second functional pattern of the underlying layer 130 may have a 3D pattern corresponding to a medium grain sanding pad (e.g., 100 grain), and a functional pattern of the inner layer 140 may have a 3D pattern corresponding to a fine grain sanding pad (e.g., 80 grain).

Additionally, or alternatively to the application examples herein, the first and second functional pattern may be arranged in a visual and functional pattern that is arranged such that each of the patterns is indicative of the stage within the life of the object, e.g. a new product, a partially worn product, a fully worn product.

Figure 2:
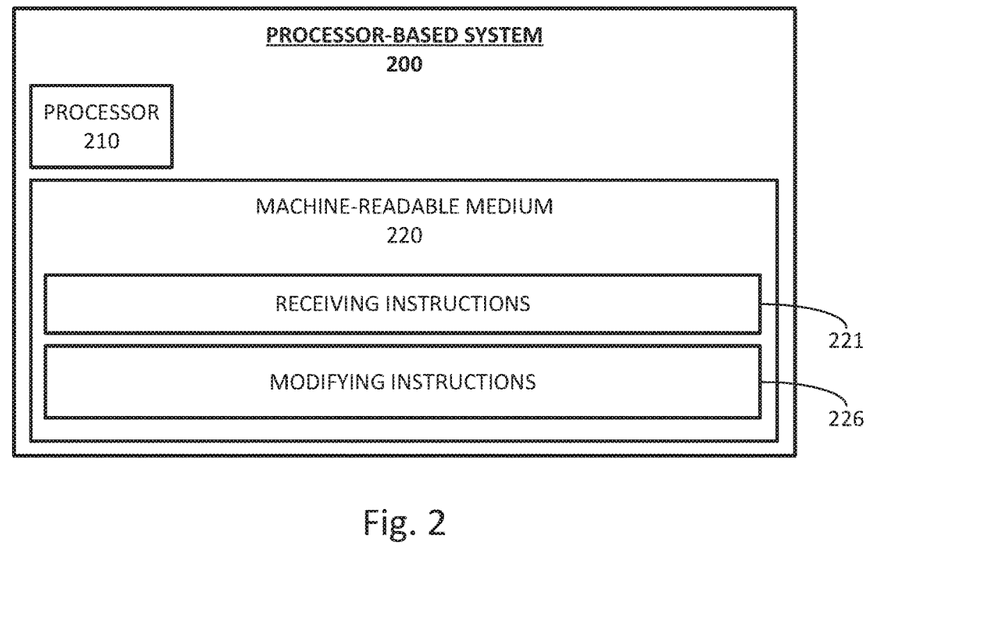
FIG. 2 is a block diagram showing a processor-based system example to modify object data of a part of an object to be 3D printed.

FIG. 2 is a block diagram showing a processor-based system 200 example to modify object data of a part 110 of an object 100 to be 3D printed. In the examples herein, the instructions of system 200 may involve previously disclosed elements from FIGS. 1A-1B referred to with the same reference numerals.

In some implementations, the system 200 may be or may form part of a computing unit within a 3D printing system or facility. In some implementations, the system 200 is a processor-based system and may include a processor 210 coupled to a machine-readable medium 220. The processor 210 may include a single-core processor, a multi-core processor, an application-specific integrated circuit (ASIC), a field programmable gate array (FPGA), and/or any other hardware device suitable for retrieval and/or execution of instructions from the machine-readable medium 220 (e.g., instructions 221-226) to perform functions related to various examples. Additionally, or alternatively, the processor 210 may include electronic circuitry for performing the functionality described herein, including the functionality of instructions 221-226. With respect of the executable instructions represented as boxes in FIG. 2, it should be understood that part or all of the executable instructions and/or electronic circuits included within one box may, in alternative implementations, be included in a different box shown in the figures or in a different box not shown.

The machine-readable medium 220 may be any medium suitable for storing executable instructions, such as a random-access memory (RAM), electrically erasable programmable read-only memory (EEPROM), flash memory, hard disk drives, optical disks, and the like. In some example implementations, the machine-readable medium 220 may be a tangible, non-transitory medium, where the term "non-transitory" does not encompass transitory propagating signals. The machine-readable medium 220 may be disposed within the processor-based system 200, as shown in FIG. 2, in which case the executable instructions may be deemed "installed" on the system 200. Alternatively, the machine-readable medium 220 may be a portable (e.g., external) storage medium, for example, that allows system 200 to remotely execute the instructions or download the instructions from the storage medium. In this case, the executable instructions may be part of an "installation package". As described further herein below, the machine-readable medium may be encoded with a set of executable instructions 221-226.

Instructions 221, when executed by the processor 210, may cause the processor 210 to receive object data that represents a part 110 of an object 100 which is to be manufactured by a 3D printer. In some examples, the format of the data may include a Computer Aided Product (CAD) file. Some examples of the part 110 of the object 100 may include an outsole, a tyre tread or a grip.

Instructions 226, when executed by the processor 210, may cause the processor 210 to modify the received object data to include a plurality of functional layers of a predetermined thickness including an outer layer 120 and an underlying layer 130 immediately below the outer layer 120. The processor 210 may modify the received data such that the outer layer 120 and the underlying layer 130 comprise the same as or similar features to the outer layer 120 and the underlying layer 130 described with reference to FIGS. 1A-1B.

The object data is modified such that the outer layer 120 comprises a first set of solidified portions 122 and a first set of voids 124 arranged in a 3D pattern such that the first set of solidified portions 122 are raised above the underlying layer 130 to form a first functional structure. The object data is further modified such that the underlying layer 130 comprises a second set of solidified portions 132 and a second set of voids 134 arranged in a 3D pattern such that the second set of solidified portions 132 are raised above its underlying layer (e.g., inner layer 140) to form a second functional structure. The second set of voids 134 are encapsulated within the object such that removal of a portion of the outer layer 120 exposes the corresponding portion of the second functional structure.

Figure 3:
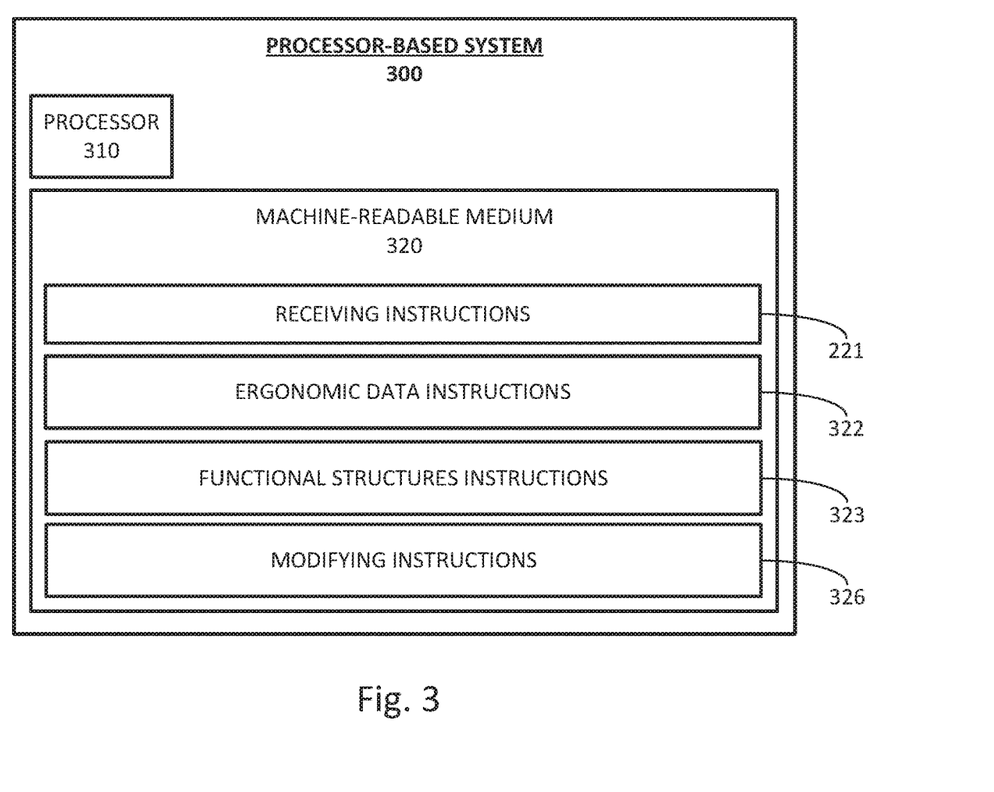
FIG. 3 is a block diagram showing a processor-based system example to modify object data of a part of an object to be 3D printed based on ergonomic data.

FIG. 3 is a block diagram showing a processor-based system 300 example to modify object data of a part 110 of an object 100 to be 3D printed based on ergonomic data. The processor-based system 300 may be similar to the processor-based system 200 disclosed with reference to FIG. 2. The processor-based system 300 comprises a processor 310 to execute instructions 221-326 and perform the functionality disclosed herein. In the examples herein, the instructions of system 300 may involve previously disclosed elements from FIGS. 1A-1B referred to with the same reference numerals.

Instructions 221, when executed by the processor 310, may cause the processor 310 to receive object data that represents a part 110 of an object 100 which is to be manufactured by a 3D printer. In some examples, instructions 221 may be the same instructions as instructions 221 from FIG. 2.

Instructions 322, when executed by the processor 310, may cause the processor 310 to receive ergonomic data of a user. In the examples herein, ergonomic data should be interpreted as data including information about physical features of a user such that the user may interact more efficiently, more safely, etc. with the object 100. Some examples of ergonomic data may include foot pressure distribution data and grip distribution.

Instructions 323, when executed by the processor 310, may cause the processor 310 to determine the first and second functional structures to be applied to the outer layer 120 and underlying layer 130 respectively, based on the received ergonomic data.

Instructions 326, when executed by the processor 310, may cause the processor 410 to modify the received object data to include a plurality of layers including the outer layer 120 and an underlying layer 130 with the first and second functional structures applied thereto, previously determined based on the received ergonomic data. Instructions 326 from FIG. 3 may be similar to instructions 226 from FIG. 2.

Figure 4:
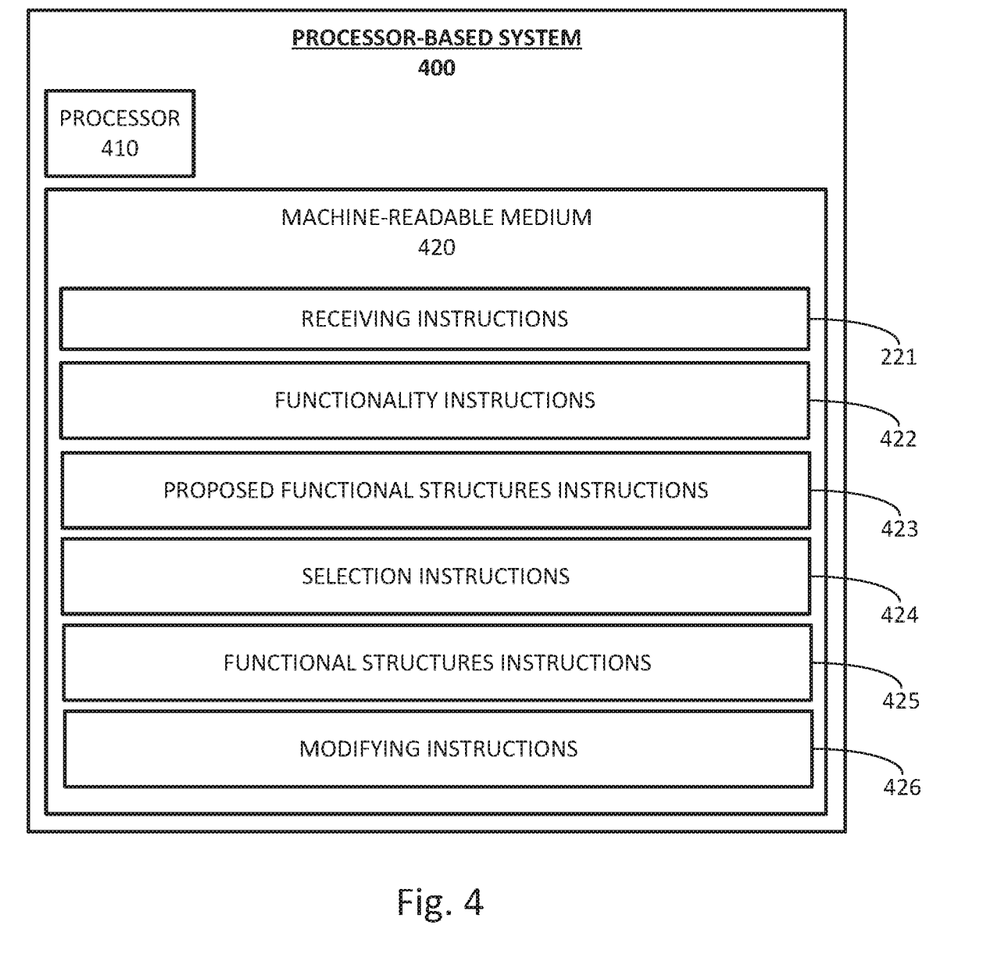
FIG. 4 is a block diagram showing a processor-based system example to modify object data of a part of an object to be 3D printed based on an intended functionality of the object.

FIG. 4 is a block diagram showing a processor-based system 400 example to modify object data of a part 110 of an object 100 to be 3D printed based on the intended functionality of the object 100. The processor-based system 400 may be similar to the processor-based system 200 disclosed with reference to FIG. 2. The processor-based system 400 comprises a processor 410 to execute instructions 221-426 and perform the functionality disclosed herein. In the examples herein, the instructions of system 400 may involve previously disclosed elements from FIGS. 1A-1B referred to with the same reference numerals.

Instructions 221, when executed by the processor 410, may cause the processor 410 to receive object data that represents a part 110 of an object 100 which is to be manufactured by a 3D printer. In some examples, instructions 221 may be the same instructions as instructions 221 from FIG. 2.

Instructions 422, when executed by the processor 410, may cause the processor 410 to receive an input of an intended functionality of the part 110 of the object 100. Instructions 423, when executed by the processor 410, may cause the processor 410 to output a set of proposed functional structures to the user which are suitable to generate the received intended functionality in a generated 3D object. In some examples, one of the set of proposed functional structures may comprise the same functional structure for the outer layer 120 and the underlying layer 130. In other examples, one of the sets of proposed functional structures may comprise a different functional structure for the outer layer 120 (i.e., first functional structure) than the functional structure for the underlying layer 130 (i.e., second functional structure). Instructions 424, when executed by the processor 410, may cause the processor 410 to receive a selection of a functional structure from the set of proposed functional structures. The selection may be made by an object 100 designer.

Instructions 425, when executed by the processor 410, may cause the processor 410 to determine the first and second functional structures to be applied to the outer layer 120 and underlying layer 130 respectively, based on the received functional structure selection.

Instructions 426, when executed by the processor 410, may cause the processor 410 to modify the received object data to include a plurality of layers including the outer layer 120 and an underlying layer 130 with the first and second functional structures applied thereto, previously determined based on the received functional structure selection. Instructions 426 from FIG. 4 may be similar to instructions 226 from FIG. 2.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: An object of which at least a part has been 3D printed, the part comprising:
a plurality of layers of a predetermined thickness including an outer layer and an underlying layer immediately below the outer layer;
the outer layer comprising a first set of solidified portions and a first set of voids arranged in a 3D pattern such that the first set of solidified portions are raised above the underlying layer to form a first functional structure; the underlying layer comprising:
a second set of solidified portions and a second set of voids arranged in a 3D pattern such that the second set of solidified portions are raised above its underlying layer, to form a second functional structure, wherein the voids are encapsulated within the object;
such that removal of a portion of the outer layer exposes a corresponding portion of the second functional structure.

Feature set 2: An object with feature set 1, wherein the voids are filled with a substance that includes at least one of a gas, liquid build material or powder build material and wherein upon the removal of the portion, the substance is releasable from the object.

Feature set 3: An object with any preceding feature set 1 to 2, wherein the solidified portions comprise one of a constant cross-section or a variable cross-section.

Feature set 4: An object with any preceding feature set 1 to 3, wherein the first and second functional structures have the same pattern.

Feature set 5: An object with any preceding feature set 1 to 3, wherein the first and second functional structures have a different pattern.

Feature set 6: An object with any preceding feature set 1 to 5, wherein the part of the object is an outsole.

Feature set 7: An object with any preceding feature set 1 to 5, wherein the object is a tire and the part of the object is a tyre tread.

Feature set 8: An object with any preceding feature set 1 to 5, wherein the part of the object is a grip.

Feature set 9: A non-transitory machine-readable medium storing instructions executable by a processor, the non-transitory machine-readable medium comprising:
instructions to receive object data that represents a part of an object; and
instructions to modify the object data to include a plurality of layers of a predetermined thickness including an outer layer and an underlying layer immediately below the outer layer,
the outer layer comprising a first set of solidified portions and a first set of voids arranged in a 3D pattern such that the first set of solidified portions are raised above the underlying layer to form a first functional structure, and
the underlying layer comprising a second set of solidified portions and a second set of voids arranged in a 3D pattern such that the second set of solidified portions are raised above its underlying layer to form a second functional structure, wherein the voids are encapsulated within the object such that removal of a portion of the outer layer exposes a corresponding portion of the second functional structure.

Feature set 10: A non-transitory machine-readable medium with feature set 9, wherein the solidified portions comprise one of a constant cross-section or a variable cross-section.

Feature set 11: A non-transitory machine-readable medium with any preceding feature set 9 to 10, wherein the first and second functional structures have the same pattern.

Feature set 12: A non-transitory machine-readable medium with any preceding feature set 9 to 10, wherein the first and second functional structures have a different pattern.

Feature set 13: A non-transitory machine-readable medium with any preceding feature set 9 to 12, further comprising instructions to: (i) receive ergonomic data of a user, and (ii) determine the first and second functional structures to be applied to a layer based on the ergonomic data.

Feature set 14: A non-transitory machine-readable medium with any preceding feature set 9 to 13, further comprising instructions to: (i) receive an input of an intended functionality of the part of the object; (ii) output a set of proposed functional structures to the user; (iii) receive a selection of a functional structure from the set of proposed functional structures; and (iv) determine the first and/or second functional structures to be applied to the object based on the selection.

Feature set 15: A method of manufacturing an object, the method comprising:
receiving object data that represents a part of the object which is to be manufactured by a 3D printer; and
modifying the object data to include a plurality of layers of a predetermined thickness including an outer layer and an underlying layer immediately below the outer layer,
the outer layer comprising a first set of solidified portions and a first set of voids arranged in a 3D pattern such that the first set of solidified portions are raised above the underlying layer to form a first functional structure, and
the underlying layer comprising a second set of solidified portions and a second set of voids arranged in a 3D pattern such that the second set of solidified portions are raised above its underlying layer to form a second functional structure, wherein the voids are encapsulated within the object such that removal of a portion of the outer layer exposes a corresponding portion of the second functional structure.

What it is claimed is:

1. An object of which at least a part has been 3D printed, the part comprising:
a plurality of layers of a predetermined thickness including an outer layer and an underlying layer immediately below the outer layer;
the outer layer comprising a first set of solidified portions and a first set of voids arranged in a 3D pattern such that the first set of solidified portions are raised above the underlying layer to form a first functional structure;
the underlying layer comprising:
a second set of solidified portions and a second set of voids arranged in a 3D pattern such that the second set of solidified portions are raised above its underlying layer, to form a second functional structure, wherein the voids are encapsulated within the object;
such that removal of a portion of the outer layer exposes a corresponding portion of the second functional structure.

2. The object of claim 1, wherein the voids are filled with a substance that includes at least one of a gas, liquid build material or powder build material and wherein upon the removal of the portion, the substance is releasable from the object.

3. The object of claim 1, wherein the solidified portions comprise one of a constant cross-section or a variable cross-section.

4. The object of claim 1, wherein the first and second functional structures have the same pattern.

5. The object of claim 1, wherein the first and second functional structures have a different pattern.

6. The object of claim 1, wherein the part of the object is an outsole.

7. The object of claim 1, wherein the object is a tire and the part of the object is a tyre tread.

8. The object of claim 1, wherein the part of the object is a grip.

9. A non-transitory machine-readable medium storing instructions executable by a processor, the non-transitory machine-readable medium comprising:
instructions to receive object data that represents a part of an object; and
instructions to modify the object data to include a plurality of layers of a predetermined thickness including an outer layer and an underlying layer immediately below the outer layer,
the outer layer comprising a first set of solidified portions and a first set of voids arranged in a 3D pattern such that the first set of solidified portions are raised above the underlying layer to form a first functional structure, and
the underlying layer comprising a second set of solidified portions and a second set of voids arranged in a 3D pattern such that the second set of solidified portions are raised above its underlying layer to form a second functional structure, wherein the voids are encapsulated within the object such that removal of a portion of the outer layer exposes a corresponding portion of the second functional structure.

10. The non-transitory machine-readable medium of claim 9, wherein the solidified portions comprise one of a constant cross-section or a variable cross-section.

11. The non-transitory machine-readable medium of claim 9, wherein the first and second functional structures have the same pattern.

12. The non-transitory machine-readable medium of claim 9, wherein the first and second functional structures have a different pattern.

13. The non-transitory machine-readable medium of claim 9, further comprising instructions to:
receive ergonomic data of a user; and
determine the first and second functional structures to be applied to a layer based on the ergonomic data.

14. The non-transitory machine-readable medium of claim 9, further comprising instructions to:
receive an input of an intended functionality of the part of the object;
output a set of proposed functional structures to a user;
receive a selection of a functional structure from the set of proposed functional structures; and
determine the first and/or second functional structures to be applied to the object based on the selection.

15. A method of manufacturing an object, the method comprising:
receiving object data that represents a part of the object which is to be manufactured by a 3D printer; and
modifying the object data to include a plurality of layers of a predetermined thickness including an outer layer and an underlying layer immediately below the outer layer, the outer layer comprising a first set of solidified portions and a first set of voids arranged in a 3D pattern such that the first set of solidified portions are raised above the underlying layer to form a first functional structure, and the underlying layer comprising a second set of solidified portions and a second set of voids arranged in a 3D pattern such that the second set of solidified portions are raised above its underlying layer to form a second functional structure, wherein the voids are encapsulated within the object such that removal of a portion of the outer layer exposes a corresponding portion of the second functional structure.

* * * * *